United States Patent [19]

Sunder et al.

[11] Patent Number: 4,539,094

[45] Date of Patent: Sep. 3, 1985

[54] EXTRACTION OF DEPOLYMERIZED CARBONACEOUS MATERIAL USING SUPERCRITICAL AMMONIA

[75] Inventors: Swaminathan Sunder; Robert N. Miller, both of Allentown, Pa.

[73] Assignee: Air Products and Chemicals, Inc., Allentown, Pa.

[21] Appl. No.: 601,890

[22] Filed: Apr. 19, 1984

[51] Int. Cl.$^3$ .......................... C10G 1/00; C10G 1/06
[52] U.S. Cl. .................................. 208/8 LE; 585/240
[58] Field of Search .................. 208/8 LE, 10; 201/36

[56] References Cited

U.S. PATENT DOCUMENTS

| T700,485 | 1/1968 | Hemminger et al. | |
| 2,133,280 | 10/1938 | Burk | 208/8 LE X |
| 2,286,823 | 6/1942 | McMillan | 208/45 X |
| 3,558,468 | 1/1971 | Wise | 208/8 LE |
| 3,642,607 | 2/1972 | Seitzer | 208/8 LE |
| 3,850,477 | 11/1974 | Aldrich et al. | 208/8 LE X |
| 4,057,484 | 11/1977 | Malek | 208/8 LE |
| 4,159,240 | 6/1979 | Malek | 208/8 LE X |
| 4,428,821 | 1/1984 | Baset | 208/8 LE X |
| 4,448,665 | 5/1984 | Zaczepinski et al. | 208/8 LE |

OTHER PUBLICATIONS

NASA Technical Brief, vol. 6, No. 2, Item 41, Environmental Science and Technology, vol. 16, No. 10 (1982).
M. Matida et al., Fuel, vol. 56 (1977).

*Primary Examiner*—D. E. Gantz
*Assistant Examiner*—William G. Wright
*Attorney, Agent, or Firm*—Geoffrey L. Chase; E. Eugene Innis; James C. Simmons

[57] ABSTRACT

Improved extraction and recovery of carbonaceous products are achieved by the aqueous alkali depolymerization of carbonaceous materials, low rank coals, followed by the supercritical extraction with ammonia when the depolymerized material retains a significant aqueous presence.

7 Claims, No Drawings

EXTRACTION OF DEPOLYMERIZED CARBONACEOUS MATERIAL USING SUPERCRITICAL AMMONIA

TECHNICAL FIELD

The present invention is directed to the recovery of lower molecular weight carbonaceous material from higher molecular weight carbonaceous material. More specifically the process is directed to the supercritical solvent extraction of depolymerized carbonaceous material from residues of a depolymerization pretreatment. The invention is particularly related to the processing of low rank coals with such a technique.

BACKGROUND OF THE PRIOR ART

Carbonaceous materials such as wood, peat, coal and heavy viscous petroleums, such as tar sands, have historically been treated in several distinct techniques in order to reduce the molecular weight of the raw, fresh carbonaceous material to a more utilizable lower molecular weight product, which preferably also enjoys reduced mineral and metal impurities. The desired end products typically have greater combustibility, volatility or a favorable physical state change from solid to liquid phase.

Coal has been pretreated in various manners, such as direct gasification to gas phase products including syngas and hydrogen. Coal has also been liquefied using various high pressure and high temperature processes, typically with a hydrogenation atmosphere. Additionally, coal has been pretreated to lower molecular weight materials by various solvent extraction techniques.

Other carbonaceous materials such as wood and peat have been treated in similar processes in order to reduce molecular weight and destruct various molecular cross-linkages to effect a desired low molecular weight end product, but these raw material sources have generally been less desirable and have been studied with less enthusiasm by the prior art.

Supercritical extraction of various relevant materials, such as carbonaceous sources chosen from wood, peat and various coals has been performed in the prior art particularly in order to extract components of the carbonaceous material from the fresh untreated source. The technique of supercritical extraction exploits the optimum combination of fluid properties near the critical point of the chosen solvent. These properties include the liquid-like densities of supercritical fluids which have liquid magnitude dissolving power and gas-like diffusivities for high mass transfer rates. The rapid change in densities with only a slight change in temperature or pressure can be used for almost complete separation of the solvent from the extract after extraction from the base source material. Supercritical extraction has particular applicability to the separation of components that are unstable at high temperatures and high temperature processing, such as distillation.

Early work on supercritical extraction of coal ranging from low volatile to high volatile bituminous coals having volatile matter contents ranging from 18 to 45% was performed by the National Coal Board of Great Britain. It was found that the extract yield was directly proportional to the volatile matter content, which suggested that low rank coals are most suited for this technique. Typically, the maximum extract yield was only in the range of 25%. The effect of operating variables with the supercritical extraction of coal has been studied with the end result being that pressure and temperature were identified as important variables. Extract yields of 35% could be obtained using toluene at 420° C. and 4,000 psi. Such extracts were then readily refined by hydrocracking to distillable oils. Supercritical extraction has been shown to be best applicable to low rank coals, yet gives only moderate yields of approximately 35% when no hydrogen donating components or molecular hydrogen are present in the extraction process.

In U.S. Pat. No. 3,558,468 the use of various supercritical fluids including ammonia is set forth for the treatment of carbonaceous material such as coal, coal tar, pitch and anthracene paste.

In a NASA technical brief, vol. 6, no. 2, item 41, a discussion of the mixtures of high critical temperature and low critical temperature solvents for the extraction of bitumen from tar sand is set forth. Ammonia is suggested as one of the low critical temperature solvents.

Defensive U.S. Pat. No. 700,485 to C. E. Hemminger, et al. discloses a two step process for the conventional solvent liquefaction of coal followed by solvent supercritical extraction with various solvents including ammonia.

In Environmental Science and Technology, vol. 16, no. 10 (1982), N. Vasilakos teaches that ammonia is a potential candidate for supercritical extraction of coal. It is apparent that the supercritical extraction is performed on the raw coal in a un-processed condition.

M. Matida, et al. in Fuel, vol. 56 (1977) describe the extraction of a Japanese bituminous coal with liquid ammonia making the residual coal more amenable to further processing, such as gasification. The process involves ammonia as a pretreatment of the coal for subsequent treatment with other known process techniques. It does not utilize ammonia treatment on pretreated coal.

The prior art generally has utilized supercritical extraction and various extractions with ammonia either as an initial treatment of coal to prepare it for subsequent processing or as a treatment after traditional solvent liquefaction techniques. These processes have generally effected limited recovery of further refined or low molecular weight coal products from coal. The present invention utilizes a unique combination of a particular depolymerization technique and solvent extraction with supercritical ammonia to effect a significant improvement in the recovery of depolymerized coal or other carbonaceous products of lower molecular weight, as will be set forth below.

BRIEF SUMMARY OF THE INVENTION

The present invention constitutes an extraction process for separating depolymerized carbonaceous product from carbonaceous materials selected from the group comprising wood, peat and low rank coals, such as brown coal, lignite, sub-bituminous coals and bituminous coals, which carbonaceous materials are subjected to a depolymerization pretreatment in an aqueous alkali medium at elevated temperature and pressure. The extraction of the thus pretreated carbonaceous material is performed with ammonia under supercritical conditions on the aqueous alkali pretreated carbonaceous materials such that they are retained in an aqueous presence subsequent to such pretreatment so that the depolymerized material retains an incipient moisture content of at least 30% during the supercritical extraction with ammonia.

It is important to the operation of the present process that the pretreated carbonaceous material which has been contacted with an aqueous alkali medium during pretreatment is maintained in a moist condition from the pretreatment step to the extraction step in order that the effect of the extraction is maximized.

Preferably the pretreated depolymerized carbonaceous material is neutralized with acid after the treatment in the aqueous alkali medium.

Preferably the essentially supercritical conditions are maintained at 130°–250° C. temperature range and 1600–4000 psi pressure range.

The process is particularly effective for the recovery of depolymerized coal product from pretreated lignite coals.

DETAILED DESCRIPTION OF THE INVENTION

The invention will presently be described in greater detail with regard to a preferred embodiment. However, the unique combination of a depolymerization pretreatment followed by a supercritical extraction with ammonia has broader applicability than merely with the lignite materials utilized in the preferred embodiments.

Treatment of coal wherein coal is heated to 100°–300° C. in the presence of an aqueous alkaline media above a pH of 11 succeeds in breaking heteroatom bonds (mainly O-C) by a hydrolytic mechanism such that the product from the reaction is "depolymerized". The depolymerized product is rendered soluble in the aqueous reaction media by both a reduction in molecular weight, as well as the formation of polar hydroxyl groups generated during the depolymerization reaction. Such a depolymerization reaction proceeds with negligible formation of hydrocarbons or other gases that are common by-products in high temperature processing, such as liquefaction techniques.

As indicated by the data set forth in Table 1 below, there is little change in the relative elemental composition of the organic matter constituting depolymerized coal compared to fresh coal. On the other hand, the solubility of the depolymerized coal in organic solvents increases dramatically based on the solubility of raw coal, indicating that significant conversion of coal during the depolymerization occurs without any substantial compositional change taking place.

In addition, depolymerized coal is characterized by an appreciably low mineral matter content and reduced sulfur content as a result of the degradation reactions of pyrite and/or aluminosilicates during the alkaline depolymerization reaction. In the case of the lignite which constitutes the examples set forth below, a reduction in sulfur is not evident because of the very low sulfur content in the form of mineral sulfur. Substantially all of the sulfur would appear to be in the form of an organic complex.

TABLE 1

|  | Depolymerized Coal | Raw Coal |
|---|---|---|
| % of Dry Solids |  |  |
| Carbon | 70.3 | 72.5 |
| Hydrogen | 4.7 | 4.3 |
| Oxygen | 18.6 | 21.5 |
| Nitrogen | 1.4 | 1.2 |
| Sulfur | 0.5 | 0.5 |
| Ash | 3.3 | 10.0 |
| Volatile Matter | 42.2 | 41.0 |
| Solubility (% daf) |  |  |

TABLE 1-continued

|  | Depolymerized Coal | Raw Coal |
|---|---|---|
| Ethyl Acetate solubles: | 23.3 | 2.3 |
| Pyridine solubles: | 64.1 | 3.7 |

Depolymerized coals are distinct from solid or liquid products obtained from conventional coal liquefaction processes in that they are highly reactive, much like the parent coal in hydrogen or hydrogen-donor solvents at liquefaction conditions. However, due to the abundance of the polar hydroxyl groups, they are prone to severe condensation when subjected to conventional high-temperature hydrogenation processes. Typically, they would form refractory products with undesirable characteristics under such high temperature processing.

The marked pyridine solubility and high oxygen content of carbonaceous materials and coals treated in aqueous alkali depolymerization processes would appear to suggest that such depolymerized materials would be amenable to supercritical extraction with various solvents in general. However, the high reactivity of depolymerized carbonaceous materials in coals to condensation reactions precludes the use of high temperature supercritical solvents, such as toluene. In addition, the poor solvent properties of the simpler linear hydrocarbons, such as N-pentane, also preclude the use of such extractants for depolymerized coal despite their lower critical temperatures and despite their known solubility for the convention liquefaction products from hydrogen donor processes, such as SRC-I, SRC-II or the Exxon donor solvent process.

It has been found in the present invention unexpectedly that ammonia under supercritical conditions will extract depolymerized coal when the coal or other carbonaceous materials have been subjected to an aqueous alkali medium at elevated temperature and pressure and the moisture incurred by the coal during depolymerization is retained so as to maintain any broken bonds from the depolymerization in an hydrolyzed state prior to the supercritical extraction.

Ammonia is particularly well suited for supercritical extraction of depolymerized carbonaceous materials due to its basically and low critical temperature of approximately 132° C. However, other factors are also important in achieving a high extraction yield, including; depolymerization under aqueous alkaline conditions, the presence and retention of a substantial incipient moisture in the depolymerized coal going to extraction, avoidance of drying of the depolymerized product prior to supercritical extraction, and appropriate operating conditions of temperature and pressure during extraction to obtain the optimum solubility parameter for the carbonaceous material or coal being extracted. The conditions for essentially supercritical extraction with ammonia for preferred operation are 130°–250° C. and 1600–4000 psi. More specifically, for the treatment of depolymerized lignite it is believed that the conditions of essentially supercritical extraction with ammonia should optimally be 130°–140° C. and 3000–3500 psi.

The results of the experiments demonstrating the present invention are set forth in Table 2 hereinbelow. The solubility parameters listed in Table 2 were calculated using the Giddings correlation set forth below.

$$\delta = 1.25 \, (P_c)^{\frac{1}{2}} \frac{\rho_r}{\rho_l}$$

-continued where
 $\delta$ = solubility parameter in $(cal/cc)^{\frac{1}{2}}$
 $P_c$ = critical pressure in atmospheres
 $\rho_r$ = reduced density at extraction conditions
 $\rho_l$ = reduced density of liquid $\simeq 2.66$ The density and critical pressure estimates were made using the Peng-Robinson equation of state, where needed. In order to first establish an upper limit for supercritical extraction, a sample of aqueous alkali treated lignite was extracted at ambient conditions by continuous elution for 7 days with dilute ammonium hydroxide solution. The yield of the extract was 90% of the dry feed, substantiating the depolymerized nature of the coal. The various examples were performed under the conditions recited in Table 2 and further as outlined below.

RAW COAL

EXAMPLE 1

As-received Beulah lignite ($-18$ mesh) was equilibrated at constant relative humidities until the said moisture contents were reached. Appropriate amounts were added to the supercritical extractor, corresponding to 10–15 gms in dry weight without any pretreatment.

DEPOLYMERIZED COAL

EXAMPLES 2, 3, 4

A 15–20 g sample of as-received Beulah lignite was weighed into a 300 cc autoclave which contained an aqueous solution of NaOH such that the concentration of base was approximately 0.4 g base/g dry coal. After sealing the reactor the mixture was heated to 250° C. for 2 hours at a pressure corresponding to the water vapor pressure at that temperature (i.e. 560 psi). Following cooling after the reaction was complete, the aqueous alkaline coal-slurry was washed from the reactor and then acidified with 6N HCl to pH=2. The acid-insoluble precipitate was washed with deionized water to remove excess salts and then centrifuged. The clear supernatant was decanted, the residue washed again with deionized water and recentrifuged. These procedures was repeated several times until the pH of the supernatant reached 4. The wet centrifuge residue was then used for the supercritical extraction by one of the following methods:

EXAMPLE 2

Samples from the wet centrifuge residue was prepared by vacuum drying at 100° C. The dried samples were then pulverized by hand grinding and used as a dry feed to the supercritical extractor, corresponding to about 10 gms in dry weight.

EXAMPLE 3

A portion of the pulverized vacuum-dried coal from above (Ex. 2) was rewetted prior to extraction: the dried depolymerized coal was suspended in distilled water overnight, then filtered, and the residue on the filter used for the extraction. Moisture contents were also determined on the residue to obtain an approximate weight of the dry coal charge, which was in the range of 10–15 gms.

EXAMPLE 4

The wet centrifuge residue was used directly as feed for the supercritical extractor. Moisture contents were determined on 4 aliquots to obtain an approximation of the dry weight of coal charged to the supercritical extractor, which corresponded to 5–8 gms in dry weight.

The supercritical extraction experiments were performed in a system that consists of two 500 ml high pressure feed vessels which supply solvent in a liquid form at room temperature to a pump which raises the solvent to supercritical pressures. The solvent was fed through a preheater and into a 100 ml extractor, both heated by a sand bath, where it then attained near critical or supercritical temperatures.

The coal charge was placed in the extractor and sealed and the system purged with nitrogen. Anhydrous ammonia or a mixture of water and ammonia was pumped to the extractor at the rate of 3–5 cc/min. When the extractor was half full, it was immersed in the sand bath at extraction temperature and the system allowed to equilibrate for several minutes until extraction temperature and pressure were attained. The coal was then extracted continuously for 60–100 minutes. The extract in the product receiver vessel, precipitated by a drop in temperature and pressure to liquid $NH_3$ conditions through a back-pressure regulator was collected every 15–20 minutes, thereby indicating the time and yield at completion. The sample cylinders were flushed out with water to avoid contamination with organic solvents, and both the extract and residue were dried for material balance in the range of 95–100%. Actual yields are shown in the Table 2 and, where needed, extrapolated values at completion are shown in the footnotes.

Under a nitrogen purge in a heating mantle, the extract solutions were evaporated to 25% of their original volume. They were then placed on a rotary evaporator and evaporated to dryness at 100° C. Flasks and contents were weighed and dried to constant weight.

The residue from the extraction, except in one case, was always agglomerated and could be recovered from the extraction vessel in several large chunks. The material was dried in a vacuum oven overnight at 100° C. and weighed.

TABLE 2

Supercritical Ammonia Extraction of Beulah Lignite

| Run No. | Example | Incipient Moisture, % | Treatment Condition | Mole % $H_2O$ in $NH_3$ | Extr. Temp. °C. | ($T_c$) | Extr. Pressure PSI | ($P_c$) | $\delta'$ | Sol./dry coal Feed Rate gm/gm min | Time at Completion min | Extr. Yield wt % | Mass Balance wt % |
|---|---|---|---|---|---|---|---|---|---|---|---|---|---|
| 6975-38 | 1A | 16.2 | Raw Coal | 0 | 180 | (132) | 3000 | (1654) | 4.4 | 0.25 | 80 | 1.2[2] | ~100 |
| 6975-52 | 1B | 37.2 | Raw Coal | 0 | 180 | (132) | 3000 | (1654) | 4.4 | 0.42 | 80 | 3.1 | 98.1 |
| 6975-73 | 1C | 40.1 | Raw Coal | 0 | 140 | (132) | 3500 | (1654) | 9.7 | 0.27 | 80 | 3.1 | 100.5 |
| 6975-63 | 2A | 0.4 | NaOH; Dried | 7.6 | 180 | (170) | 3000 | (2300) | 6.6 | 0.30 | 60[3] | 7.3 | 96.7 |
| 6975-40 | 2B | 1.0 | NaOH; Dried | 0 | 180 | (132) | 3000 | (1654) | 4.4 | 0.36 | 80 | 5.5[2] | ~100 |

TABLE 2-continued

Supercritical Ammonia Extraction of Beulah Lignite

| Run No. | Example | Incipient Moisture, % | Treatment Condition | Mole % H$_2$O in NH$_3$ | Extr. Temp. °C | ($T_c$) | Extr. Pressure PSI | ($P_c$) | $\delta'$ | Sol./dry coal Feed Rate gm/gm min | Time at Completion min | Extr. Yield wt % | Mass Balance wt % |
|---|---|---|---|---|---|---|---|---|---|---|---|---|---|
| 6975-65 | 3A | 46 | NaOH; Dried; Rewetted | 7.6 | 180 | (170) | 3000 | (2300) | 6.6 | 0.31 | 100[4] | 19.7 | 97.4 |
| 6975-67 | 3B | 52 | NaOH; Dried; Rewetted | 7.6 | 250 | (170) | 3000 | (2300) | 2.8 | 0.28 | 100[5] | 4.3 | 94.8 |
| 6975-56 | 4A | 83 | NaOH | 0 | 180 | (132) | 3000 | (1654) | 4.4 | 0.40 | 40 | 43.7 | 97.6 |
| 6975-69 | 4B | 89.7 | NaOH | 0 | 140 | (132) | 3500 | (1654) | 9.7 | 0.28 | 60 | 67.7[6] | 82.0 |

[1] $\delta$ - Nonpolar solubility parameter.
[2] Based on residue
[3] Incomplete, when extrapolated it levels off at 8.2% at 80 min.
[4] Incomplete, when extrapolated it levels off at 4.6% at 120 min.
[5] Incomplete, when extrapolated it levels off at 20% at 120 min.
[6] This yield would be 83%, if based on recovered material Example 1 above constitutes a base case for supercritical ammonia extraction of raw coal. It is clear that as these samples were not aqueous alkali depolymerized, any combination of the other criteria do not influence the extract yield significantly. The yields are all low with no excessive predrying, the presence of substantial incipient moisture in runs B and C and an optimal solubility parameter of 9.7 as set forth in run C.

In the two runs of Example 2, the supercritical extraction of aqueous alkali treated lignite which has been excessively dried to less than 1 wt% moisture content prior to extraction is illustrated. An ammonia-water solution and anhydrous ammonia were used in Runs A and B, respectively. The amount of water that can be used relative to ammonia is rather limited by its high critical temperature of 374° C. which raises the critical temperature of the mixture beyond that desirable for the avoidance of condensation reactions in the depolymerized coal. The 7.3% extraction yield in Run A wherein water was available in the ammonia extractant was only slightly higher than the 5.5% extraction yield from Run B where no moisture or water was present. Therefore, it appears that the use of water in the extraction phase is not sufficient to overcome the effects of drying subsequent to depolymerization and prior to extraction.

The several runs of Example 3 illustrate that rewetting the aqueous alkali-treated coal can restore part of its extractability. Run A was the same as Run A from Example 2, except for a high rewetted moisture content of 46% in Run A of Example 3 versus a content of 0.4% in Run A of Example 2. The extract yield of 19.7% in Run A of Example 3 is significantly higher than the dried depolymerized product runs but is not as good as runs wherein no drying occurred. Run A of Example 3 in combination with Example 2 shows that complete drying of the carbonaceous material causes an irreversible change in the depolymerized material. Even when the dried carbonaceous material is rewetted prior to extraction it is still a significant irreversibility causing a major decrease in yield. Having assured a sufficient presence of water and ammonia in Run A of Example 3, it remained to be seen that the extraction is not kinetically or mass-transfer limited. Thus, Run B of Example 3 was conducted at a higher temperature, but resulted in a much lower yield. However, this corresponds to a much lower solubility parameter as well, showing the solubility parameter's importance over kinetic and mass transfer limitations, in the range of conditions studied.

The several runs in Example 4 illustrate that supercritical extraction of aqueous alkali-treated carbonaceous material wherein a substantial aqueous presence, measured by incipient moisture, provides significantly improved extraction results or yield. Anhydrous ammonia was used in view of the water already present in the depolymerized materials. Both runs constitute a significant extraction yield over the base examples and prior art attempts to extract components from carbonaceous materials, such as coal.

Although the inventors do not wish to be held to any specific theories on the unexpected results of supercritical ammonia extraction of aqueous alkali depolymerized carbonaceous materials, it is speculated that the supercritical ammonia extraction is not merely a physical, density dependent phenomenon, but rather one augmented by strong chemical interactions. It is postulated that weak acid-base interactions between phenolates and hydroxylates in the carbonaceous material and ammonia or ionic interactions between the corresponding anions in the carbonaceous material and ammonium ions created in the presence of water provide the efficacious result. It is believed that the unique, highly polar character of the surfaces of the aqueous alkali depolymerized carbonaceous material increases the propensity for irreversible structural change upon drying. The polar functional groups (especially the hydroxyls) will condense with one another to bind the macromolecular entities tightly together. This phenomenon should result in the inability to rewet the depolymerized surface, and hence significantly alter the extractability of the material. Therefore, it is apparent that an important aspect of the invention is the retention of moisture in the time period between depolymerization and the extraction.

Finally, the employment of a solvent at a nonpolar solubility parameter of 9.7 which happens to be the empirically determined optimum range of 9.5 to 9.9 for coals, is important. This apparently maximizes the physical efficiency of the extraction, as chemical interactions are much less likely to be dependent on solvent density.

As set forth above in the various examples, the present invention provides a unique process for the recovery of significant levels of depolymerized coal in a supercritical solvent extraction technique. The use of ammonia on a depolymerized coal which has a retained aqueous presence, preferably constituting an incipient moisture content of at least 30% provides the unexpected extraction results. Such a mechanism and resulting yield would not be expected based upon the prior art disclosures in coal processing and supercritical extraction.

The present invention has been set forth with a preferred embodiment constituting the depolymerization of lignite with sodium hydroxide prior to supercritical ammonia extraction. Those skilled in the art will be able to determine obvious variations from the preferred embodiment, without departing from the scope of the invention. Therefore, scope of the invention should be ascertained from the claims which follow.

We claim:

1. An extraction process for separating solid depolymerized carbonaceous product from carbonaceous materials selected from the group of wood, peat and low rank coals which are subjected to a depolymerization pretreatment in an aqueous alkali medium at elevated temperature and pressure, wherein the extraction is performed with ammonia under supercritical conditions on said pretreated solid materials which are retained in an aqueous presence subsequent to pretreatment such that the materials have an incipient moisture content of at least 30% during extraction.

2. The extraction of claim 1 wherein the depolymerized carbonaceous material is neutralized prior to extraction.

3. The extraction of claim 1 wherein the carbonaceous material is a low rank coal chosen from the group comprising; brown coal, lignite, subbituminous coal and bituminous coal.

4. The extraction of claim 1 wherein the ammonia is anhydrous.

5. The extraction of claim 1 wherein the supercritical conditions are maintained between 130° and 250° C. and 1600 and 4000 psi.

6. The extraction of claim 1 wherein the extraction is performed for a time period in the range of 20 to 200 minutes.

7. The extraction of claim 1 wherein the supercritical conditions are optimally maintained between 130°–140° and 3000–3500 psi.

* * * * *